US012665804B2

(12) United States Patent (10) Patent No.: US 12,665,804 B2
Schornig et al. (45) Date of Patent: Jun. 23, 2026

(54) TESTING FRAMEWORK FOR LANGUAGE MODEL-BASED COMPUTER NETWORK TROUBLESHOOTING AGENTS

(71) Applicant: Cisco Technology, Inc., San Jose, CA (US)

(72) Inventors: Eduard Schornig, Haarlem (NL); Jean-Philippe Vasseur, Combloux (FR); Grégory Mermoud, Venthône (CH); Pierre-André Savalle, Rueil-Malmaison (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/381,832

(22) Filed: Oct. 19, 2023

(65) Prior Publication Data

US 2025/0132968 A1 Apr. 24, 2025

(51) Int. Cl.
| | |
|---|---|
| *H04L 41/0631* | (2022.01) |
| *G06F 9/455* | (2018.01) |
| *G06F 11/07* | (2006.01) |
| *G06F 11/3668* | (2025.01) |
| *H04L 41/14* | (2022.01) |
| *H04L 41/16* | (2022.01) |
| *H04L 51/02* | (2022.01) |

(52) U.S. Cl.
CPC .......... *H04L 41/0631* (2013.01); *G06F 9/455* (2013.01); *G06F 11/079* (2013.01); *G06F 11/3688* (2013.01); *H04L 41/145* (2013.01); *H04L 41/16* (2013.01); *H04L 51/02* (2013.01)

(58) Field of Classification Search
CPC ..... H04L 41/16; H04L 41/0631; H04L 51/02; G06F 9/455; G06F 11/079
See application file for complete search history.

(56) References Cited

U.S. PATENT DOCUMENTS

| | | | |
|---|---|---|---|
| 7,620,848 B1 | 11/2009 | Tanner | |
| 9,767,263 B1 * | 9/2017 | McInerny | ............... G06F 21/31 |
| 10,963,333 B1 | 3/2021 | Nijim et al. | |
| 11,032,124 B1 | 6/2021 | Haddow et al. | |
| 11,269,718 B1 * | 3/2022 | Chen | ...................... G06F 11/079 |
| 11,665,079 B1 * | 5/2023 | Zacks | ..................... H04L 43/12 |
| | | | 709/224 |
| 2004/0128583 A1 * | 7/2004 | Iulo | .................... G06F 11/0748 |
| | | | 714/25 |
| 2006/0224537 A1 * | 10/2006 | Gonguet | ............. H04L 41/0631 |
| | | | 706/16 |
| 2008/0168018 A1 * | 7/2008 | Rohlfing | ................. H04L 41/16 |
| | | | 706/47 |
| 2015/0341667 A1 * | 11/2015 | Liao | ........................ H04L 65/80 |
| | | | 375/240.27 |
| 2017/0063651 A1 | 3/2017 | Wang et al. | |
| 2017/0366983 A1 * | 12/2017 | Gunasekara | ........ H04L 43/0811 |
| 2018/0122363 A1 * | 5/2018 | Braz | ..................... G06F 40/237 |

(Continued)

*Primary Examiner* — Ramy M Osman
(74) *Attorney, Agent, or Firm* — Lee & Hayes, P.C.

(57) ABSTRACT

In one implementation, a device configures an impairment scenario in a computer network. The device performs an evaluation of the impairment scenario by a language model-based troubleshooting agent. The device makes a comparison between a root cause associated with the impairment scenario and the evaluation of the impairment scenario by the language model-based troubleshooting agent. The device provides an indication of the comparison.

20 Claims, 9 Drawing Sheets

(56) References Cited

U.S. PATENT DOCUMENTS

| | | | |
|---|---|---|---|
| 2019/0042663 A1* | 2/2019 | Gupta | G06F 40/35 |
| 2019/0347326 A1* | 11/2019 | Kozhaya | G06F 40/30 |
| 2019/0361977 A1* | 11/2019 | Crudele | G06F 40/211 |
| 2020/0327196 A1* | 10/2020 | Sampat | G06N 20/00 |
| 2021/0344553 A1* | 11/2021 | Blake | H04L 41/069 |
| 2022/0006760 A1* | 1/2022 | Lopes de Moraes | G06F 11/36 |
| 2022/0014426 A1* | 1/2022 | Völksen | H04L 41/064 |
| 2022/0284059 A1* | 9/2022 | Kalandyk | G06F 16/3329 |
| 2022/0309247 A1* | 9/2022 | Jacob | G06F 40/232 |
| 2023/0080724 A1* | 3/2023 | Stoops | H04L 51/02 |
| 2023/0145448 A1* | 5/2023 | Huber | G05B 23/024 |
| | | | 700/275 |
| 2023/0237277 A1 | 7/2023 | Reza et al. | |
| 2023/0334340 A1* | 10/2023 | Neal, Jr. | G06N 20/00 |
| 2024/0015076 A1* | 1/2024 | Donthireddy | H04L 43/55 |
| 2024/0054566 A1* | 2/2024 | Pattillo | G06Q 40/08 |
| 2024/0102677 A1* | 3/2024 | Aschow | F25B 45/00 |
| 2024/0143737 A1* | 5/2024 | Zamir | G06F 21/54 |
| 2024/0202062 A1* | 6/2024 | Coady | G06F 11/0709 |
| 2024/0283806 A1* | 8/2024 | Gibson | H04L 63/1425 |
| 2024/0345913 A1* | 10/2024 | Bethamsetty | H04W 24/04 |
| 2024/0378395 A1* | 11/2024 | Sommers | G06F 40/40 |
| 2025/0132968 A1* | 4/2025 | Schornig | H04L 41/145 |
| 2025/0150377 A1* | 5/2025 | Vasseur | H04L 41/16 |
| 2026/0004082 A1* | 1/2026 | Rupe | G06F 40/30 |

* cited by examiner

600

```
metadata:
  name: "sdwan-wan-circuit-congestion-br-ams-66-rt01-internet"
  description: "WAN circuit congestion"
  init_duration_m: 10
  category: "Poor Connectivity"
  impacted_users:
    —Ed
  root_cause:
    description: "packets are dropped due to WAN circuit is congested."
    device: br-ams-66-rt01
    circuit: public-internet
    interface: GigabitEthernet0/0/0
    impairment_type:
      —"Congestion"
  setup:
    —description: "Start WAN congestion on BR-AMS-66-RT01"
      executor: "lbn-br-ams-nuc3"
      tool: "iperf-start"
      params:
        bandwidth: "2M"
        duration_s: 0
        server: 10.10.20.66
        port: 5201
  teardown:
    —description: "Start WAN congestion on BR-AMS-66-RT01"
      executor: "lbn-br-ams-nuc3"
      tool: "iperf-stop"
      params:
        server: 10.10.20.66
        port: 5201
```

FIG. 6

TESTING FRAMEWORK FOR LANGUAGE MODEL-BASED COMPUTER NETWORK TROUBLESHOOTING AGENTS

TECHNICAL FIELD

The present disclosure relates generally to a testing framework for language model-based computer network troubleshooting agents.

BACKGROUND

The recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc.

In the specific context of computer networks, though, network troubleshooting and monitoring are traditionally complex tasks that rely on engineers analyzing telemetry data, configurations, logs, and events across a diverse array of network devices encompassing access points, firewalls, routers, and switches managed by various types of network controllers. Moreover, network issues can manifest in various forms, stemming from a multitude of factors, each with its own level of complexity.

Even in instances in which LLM agents have been devised to perform networking-related tasks, though, accurately and reliably evaluating their performance also remains challenging due to the complexities of deployed networks. Indeed, evaluating the performance of such an agent requires it to be used in a realistic representation of a network deployment (e.g., with multiple domains and controllers) against a large and diverse set of network states, impairments, and faults.

BRIEF DESCRIPTION OF THE DRAWINGS

The implementations herein may be better understood by referring to the following description in conjunction with the accompanying drawings in which like reference numerals indicate identically or functionally similar elements, of which:

FIG. 6 illustrates an example definition of an impairment scenario; and

DESCRIPTION OF EXAMPLE IMPLEMENTATIONS

Overview

Figure 1A:
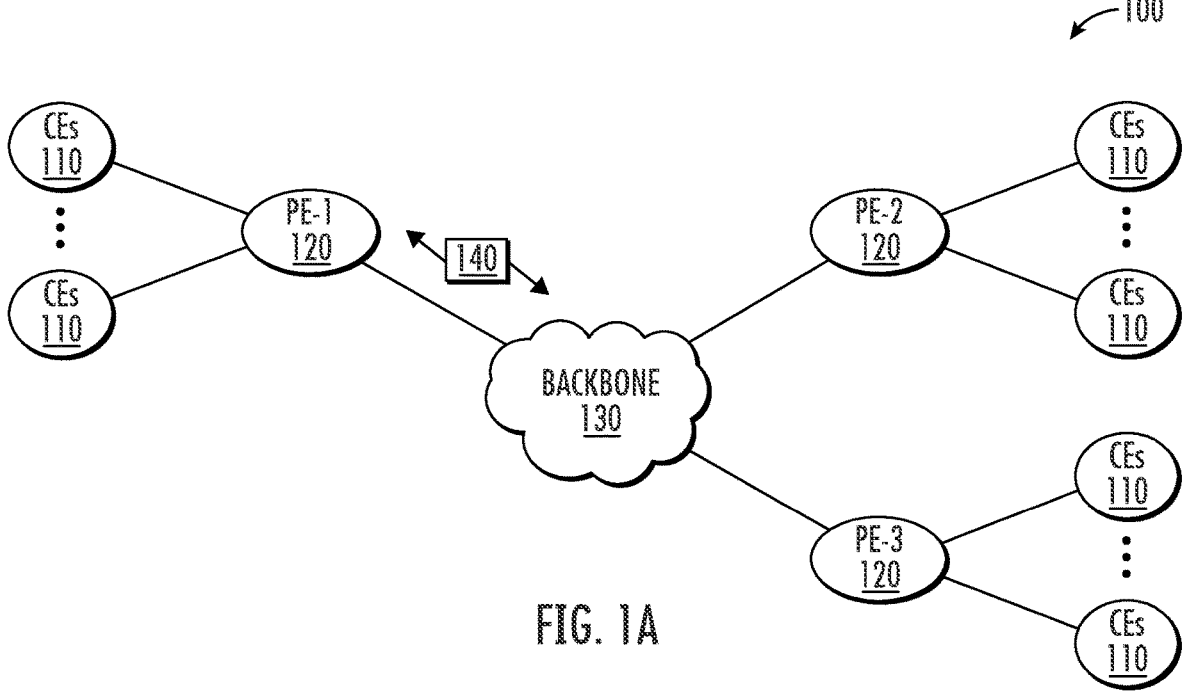
FIGS. 1A-1B illustrate an example communication network.

According to one or more implementations of the disclosure, a device configures an impairment scenario in a computer network. The device performs an evaluation of the impairment scenario by a language model-based troubleshooting agent. The device makes a comparison between a root cause associated with the impairment scenario and the evaluation of the impairment scenario by the language model-based troubleshooting agent. The device provides an indication of the comparison.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network by the CE router via two primary links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection). Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
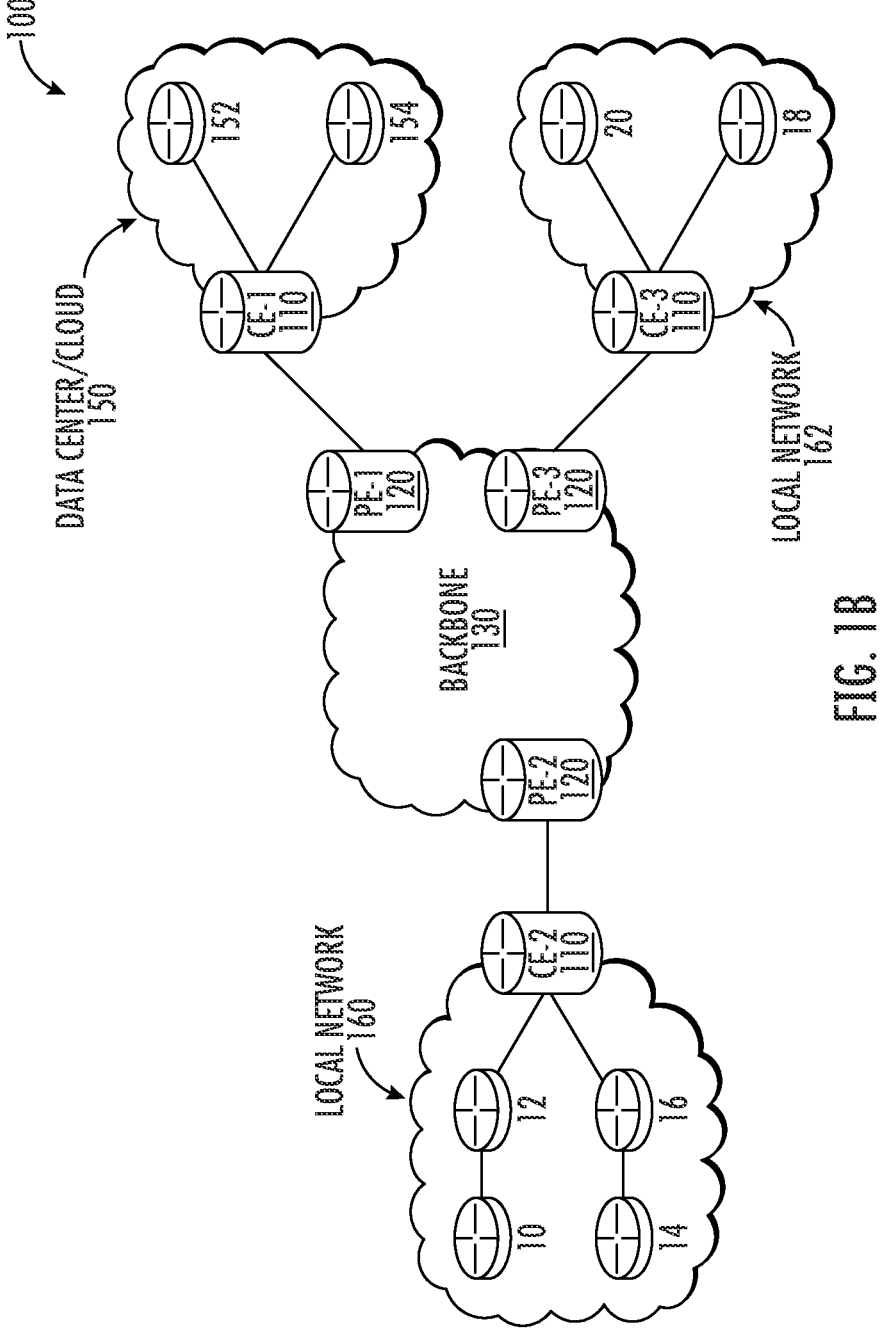

FIG. 1B illustrates an example of network 100 in greater detail, according to various implementations. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various implementations, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some implementations, the techniques herein may be applied to other network topologies and configurations. For example, the techniques herein may be applied to peering points with high-speed links, data centers, etc.

According to various implementations, a software-defined WAN (SD-WAN) may be used in network 100 to connect local network 160, local network 162, and data center/cloud environment 150. In general, an SD-WAN uses a software defined networking (SDN)-based approach to instantiate tunnels on top of the physical network and control routing decisions, accordingly. For example, as noted above, one tunnel may connect router CE-2 at the edge of local network 160 to router CE-1 at the edge of data center/cloud environment 150 over an MPLS or Internet-based service provider network in backbone 130. Similarly, a second tunnel may also connect these routers over a 4G/5G/LTE cellular service provider network. SD-WAN techniques allow the WAN functions to be virtualized, essentially forming a virtual connection between local network 160 and data center/cloud environment 150 on top of the various underlying connections. Another feature of SD-WAN is centralized management by a supervisory service that can monitor and adjust the various connections, as needed.

Figure 2:
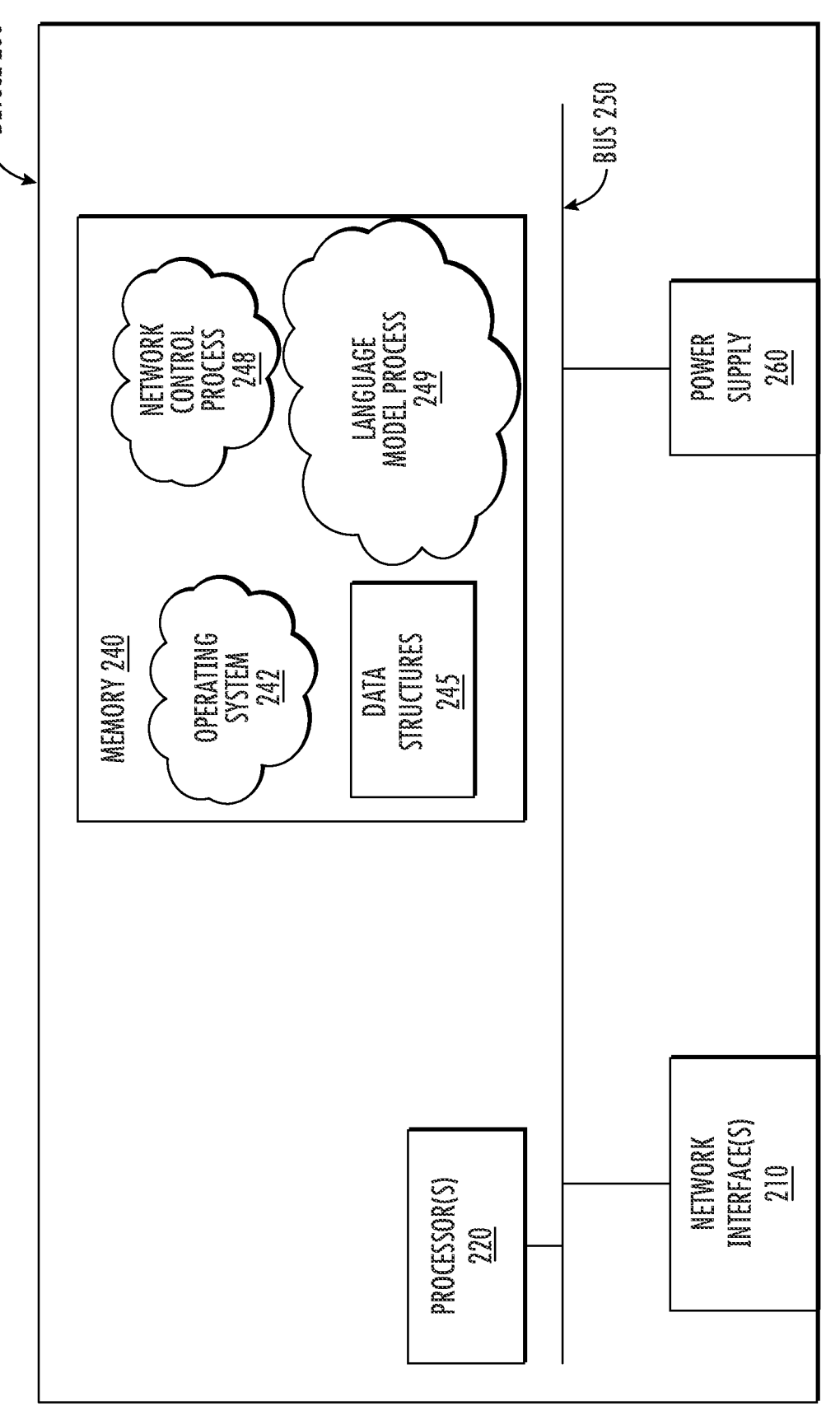
FIG. 2 illustrates an example network device/node.

FIG. 2 is a schematic block diagram of an example node/device 200 (e.g., an apparatus) that may be used with one or more implementations described herein, e.g., as any of the computing devices shown in FIGS. 1A-1B, particularly the PE routers 120, CE routers 110, nodes/device 10-20, servers 152-154 (e.g., a network controller/supervisory service located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the implementations described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software components may comprise a network control process 248 and/or a language model process 249 as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In some instances, network control process 248 may include computer executable instructions executed by the processor 220 to perform routing functions in conjunction with one or more routing protocols. These functions may, on capable devices, be configured to manage a routing/forwarding table (a data structure 245) containing, e.g., data used to make routing/forwarding decisions. In various cases, connectivity may be discovered and known, prior to computing routes to any destination in the network, e.g., link state routing such as Open Shortest Path First (OSPF), or Intermediate-System-to-Intermediate-System (ISIS), or Optimized Link State Routing (OLSR). For instance, paths may be computed using a shortest path first (SPF) or constrained shortest path first (CSPF) approach. Conversely, neighbors may first be discovered (e.g., a priori knowledge of network topology is not known) and, in response to a needed route to a destination, send a route request into the network to determine which neighboring node may be used to reach the desired destination. Example protocols that take this approach include Ad-hoc On-demand Distance Vector (AODV), Dynamic Source Routing (DSR), DYnamic MANET On-demand Routing (DYMO), etc. Notably, on devices not capable or configured to store routing entries, network control process 248 may consist solely of providing mechanisms necessary for source routing techniques. That is, for source routing, other devices in the network can tell the less capable devices exactly where to send the packets, and the less capable devices simply forward the packets as directed.

In various implementations, as detailed further below, network control process 248 and/or language model process 249 may include computer executable instructions that, when executed by processor(s) 220, cause device 200 to perform the techniques described herein. To do so, in some implementations, network control process 248 and/or language model process 249 may utilize machine learning. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

In various implementations, network control process 248 and/or language model process 249 may employ one or more supervised, unsupervised, or semi-supervised machine learning models. Generally, supervised learning entails the use of a training set of data, as noted above, that is used to train the model to apply labels to the input data. For example, the training data may include sample telemetry that has been labeled as being indicative of an acceptable performance or unacceptable performance. On the other end of the spectrum are unsupervised techniques that do not require a training set of labels. Notably, while a supervised learning model may look for previously seen patterns that have been labeled as such, an unsupervised model may instead look to whether there are sudden changes or patterns in the behavior of the metrics. Semi-supervised learning models take a middle ground approach that uses a greatly reduced set of labeled training data.

Example machine learning techniques that network control process 248 and/or language model process 249 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), generative adversarial networks (GANs), long short-term memory (LSTM), logistic or other regression, Markov models or chains, principal component analysis (PCA) (e.g., for linear models), singular value decomposition (SVD), multi-layer perceptron (MLP) artificial neural networks (ANNs) (e.g., for non-linear models), replicating reservoir networks (e.g., for non-linear models, typically for timeseries), random forest classification, or the like.

In further implementations, network control process 248 and/or language model process 249 may also include one or more generative artificial intelligence/machine learning models. In contrast to discriminative models that simply seek to perform pattern matching for purposes such as anomaly detection, classification, or the like, generative approaches instead seek to generate new content or other data (e.g., audio, video/images, text, etc.), based on an existing body of training data. For instance, in the context of network assurance, network control process 248 may use a generative model to generate synthetic network traffic based on existing user traffic to test how the network reacts. Example generative approaches can include, but are not limited to, generative adversarial networks (GANs), large language models (LLMs), other transformer models, and the like.

The performance of a machine learning model can be evaluated in a number of ways based on the number of true positives, false positives, true negatives, and/or false negatives of the model. For example, consider the case of a model that predicts whether the QoS of a path will satisfy the service level agreement (SLA) of the traffic on that path. In such a case, the false positives of the model may refer to the number of times the model incorrectly predicted that the QoS of a particular network path will not satisfy the SLA of the traffic on that path. Conversely, the false negatives of the model may refer to the number of times the model incorrectly predicted that the QoS of the path would be acceptable. True negatives and positives may refer to the number of times the model correctly predicted acceptable path performance or an SLA violation, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, in software defined WANs (SD-WANs), traffic between individual sites are sent over tunnels. The tunnels are configured to use different switching fabrics, such as MPLS, Internet, 4G or 5G, etc. Often, the different switching fabrics provide different QoS at varied costs. For example, an MPLS fabric typically provides high QoS when compared to the Internet, but is also more expensive than traditional Internet. Some applications requiring high QoS (e.g., video conferencing, voice calls, etc.) are traditionally sent over the more costly fabrics (e.g., MPLS), while applications not needing strong guarantees are sent over cheaper fabrics, such as the Internet.

Traditionally, network policies map individual applications to Service Level Agreements (SLAs), which define the satisfactory performance metric(s) for an application, such as loss, latency, or jitter. Similarly, a tunnel is also mapped to the type of SLA that is satisfies, based on the switching fabric that it uses. During runtime, the SD-WAN edge router then maps the application traffic to an appropriate tunnel. Currently, the mapping of SLAs between applications and tunnels is performed manually by an expert, based on their experiences and/or reports on the prior performances of the applications and tunnels.

The emergence of infrastructure as a service (IaaS) and software-as-a-service (SaaS) is having a dramatic impact of the overall Internet due to the extreme virtualization of services and shift of traffic load in many large enterprises. Consequently, a branch office or a campus can trigger massive loads on the network.

Figure 3A:
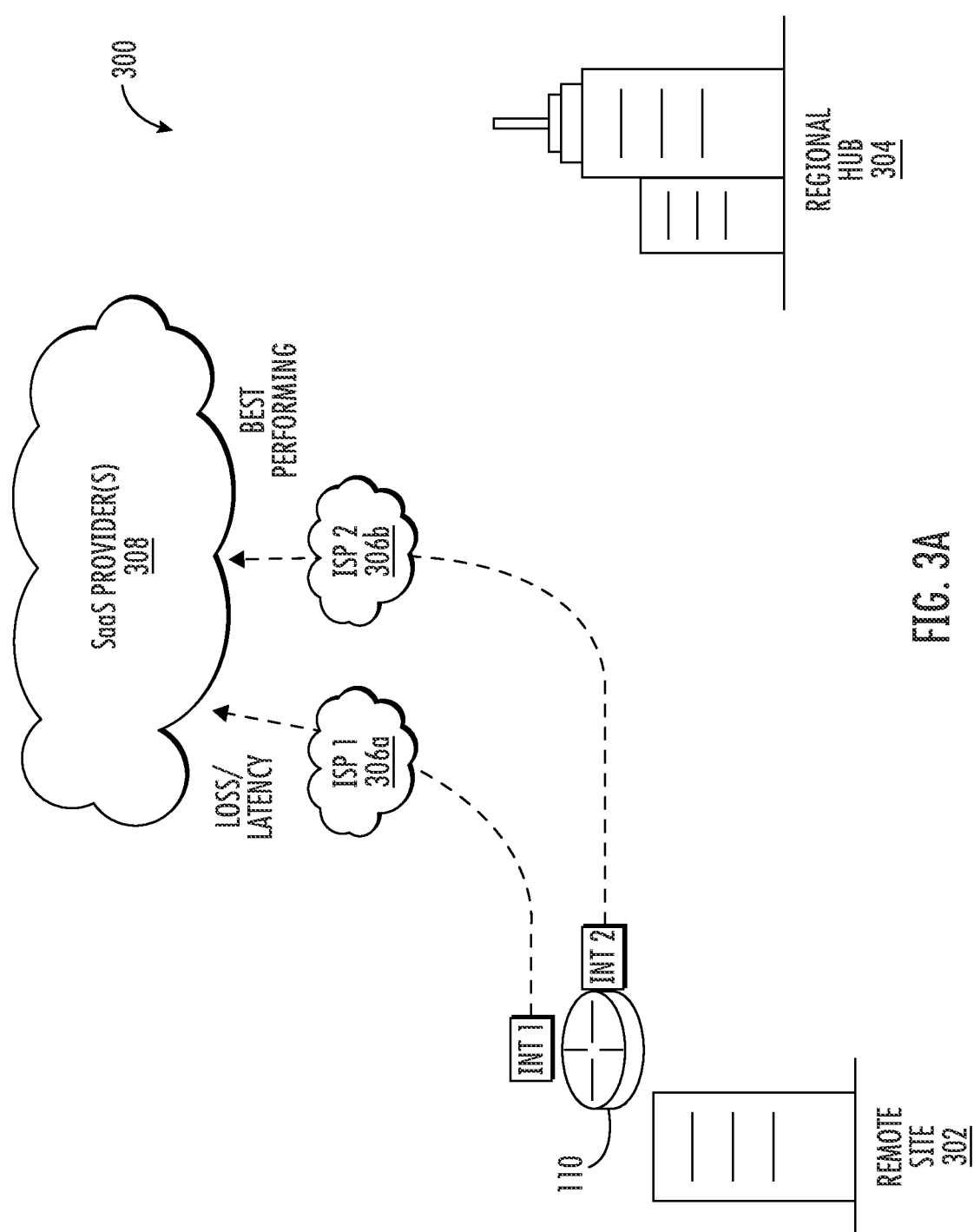
FIGS. 3A-3B illustrate example network deployments.
Figure 3B:
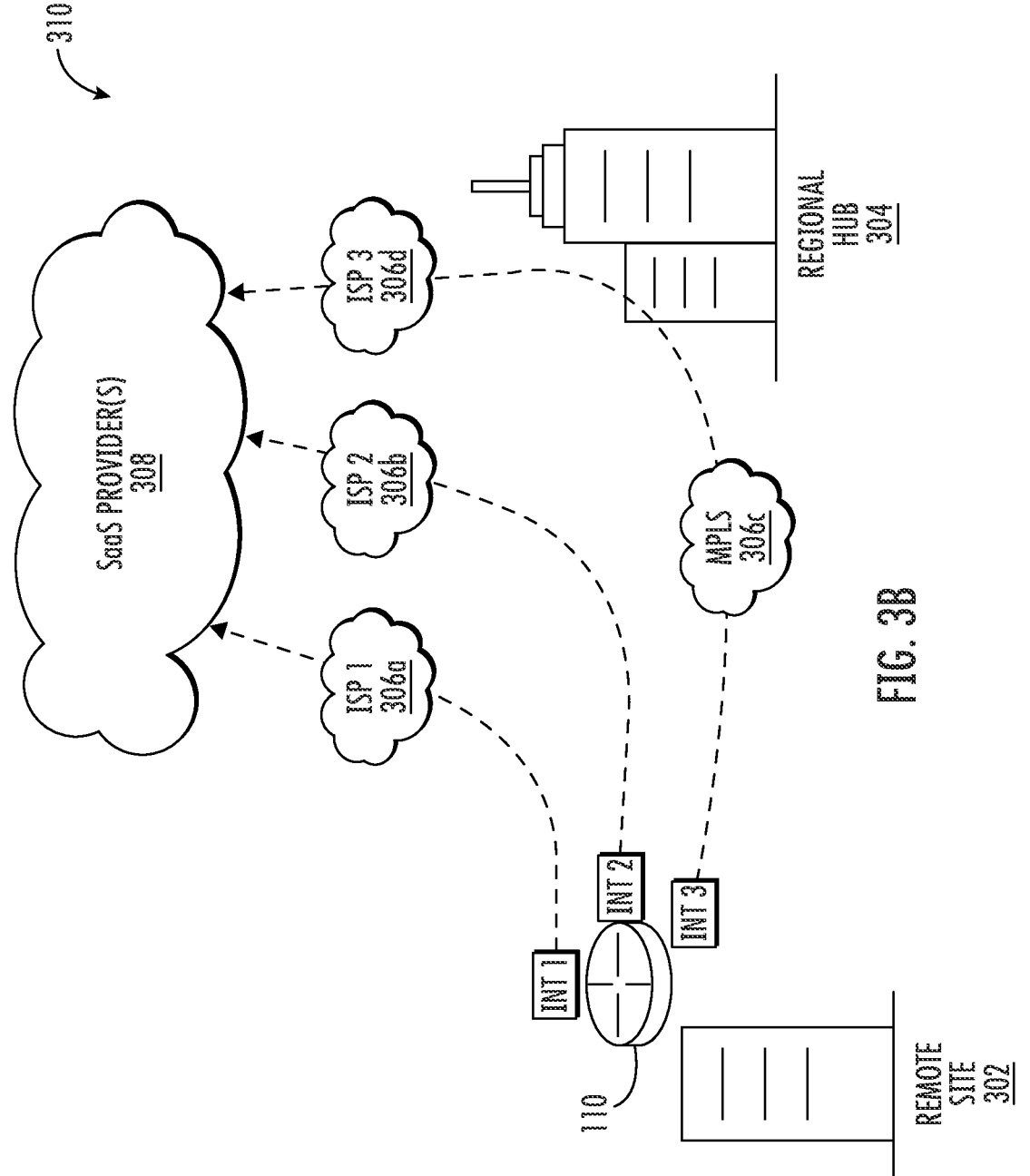

FIGS. 3A-3B illustrate example network deployments 300, 310, respectively. As shown, a router 110 located at the edge of a remote site 302 may provide connectivity between a local area network (LAN) of the remote site 302 and one or more cloud-based, SaaS providers 308. For example, in the case of an SD-WAN, router 110 may provide connectivity to SaaS provider(s) 308 via tunnels across any number of networks 306. This allows clients located in the LAN of remote site 302 to access cloud applications (e.g., Office 365™, Dropbox™, etc.) served by SaaS provider(s) 308.

As would be appreciated, SD-WANs allow for the use of a variety of different pathways between an edge device and an SaaS provider. For example, as shown in example network deployment 300 in FIG. 3A, router 110 may utilize two Direct Internet Access (DIA) connections to connect with SaaS provider(s) 308. More specifically, a first interface of router 110 (e.g., a network interface 210, described previously), Int 1, may establish a first communication path (e.g., a tunnel) with SaaS provider(s) 308 via a first Internet Service Provider (ISP) 306a, denoted ISP 1 in FIG. 3A. Likewise, a second interface of router 110, Int 2, may establish a backhaul path with SaaS provider(s) 308 via a second ISP 306b, denoted ISP 2 in FIG. 3A.

FIG. 3B illustrates another example network deployment 310 in which Int 1 of router 110 at the edge of remote site 302 establishes a first path to SaaS provider(s) 308 via ISP 1 and Int 2 establishes a second path to SaaS provider(s) 308 via a second ISP 306b. In contrast to the example in FIG. 3A, Int 3 of router 110 may establish a third path to SaaS provider(s) 308 via a private corporate network 306c (e.g., an MPLS network) to a private data center or regional hub 304 which, in turn, provides connectivity to SaaS provider(s) 308 via another network, such as a third ISP 306d.

Regardless of the specific connectivity configuration for the network, a variety of access technologies may be used (e.g., ADSL. 4G, 5G, etc.) in all cases, as well as various networking technologies (e.g., public Internet, MPLS (with or without strict SLA), etc.) to connect the LAN of remote site 302 to SaaS provider(s) 308. Other deployments scenarios are also possible, such as using Colo, accessing SaaS provider(s) 308 via Zscaler or Umbrella services, and the like.

Figure 4:
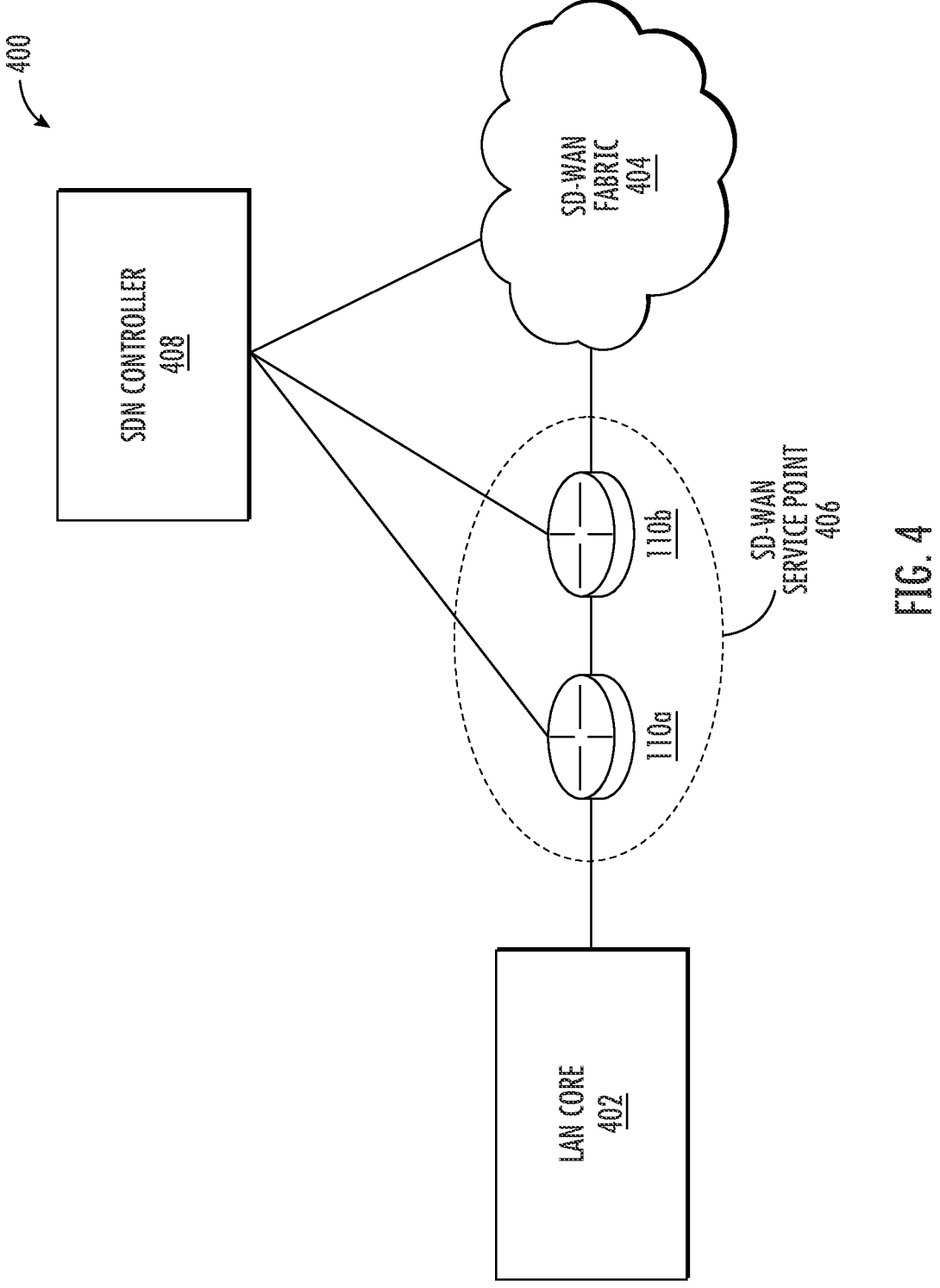
FIG. 4 illustrates an example software defined network (SDN) implementation.

FIG. 4 illustrates an example SDN implementation 400, according to various implementations. As shown, there may be a LAN core 402 at a particular location, such as remote site 302 shown previously in FIGS. 3A-3B. Connected to LAN core 402 may be one or more routers that form an SD-WAN service point 406 which provides connectivity between LAN core 402 and SD-WAN fabric 404. For instance, SD-WAN service point 406 may comprise routers 110a-110b.

Overseeing the operations of routers 110a-110b in SD-WAN service point 406 and SD-WAN fabric 404 may be an SDN controller 408. In general, SDN controller 408 may comprise one or more devices (e.g., a device 200) configured to provide a supervisory service (e.g., through execution of network control process 248), typically hosted in the cloud, to SD-WAN service point 406 and SD-WAN fabric 404. For instance, SDN controller 408 may be responsible for monitoring the operations thereof, promulgating policies (e.g., security policies, etc.), installing or adjusting IPsec routes/ tunnels between LAN core 402 and remote destinations such as regional hub 304 and/or SaaS provider(s) 308 in FIGS. 3A-3B, and the like.

As noted above, a primary networking goal may be to design and optimize the network to satisfy the requirements of the applications that it supports. So far, though, the two worlds of "applications" and "networking" have been fairly siloed. More specifically, the network is usually designed in order to provide the best SLA in terms of performance and reliability, often supporting a variety of Class of Service (CoS), but unfortunately without a deep understanding of the actual application requirements. On the application side, the networking requirements are often poorly understood even for very common applications such as voice and video for which a variety of metrics have been developed over the past two decades, with the hope of accurately representing the Quality of Experience (QoE) from the standpoint of the users of the application.

More and more applications are moving to the cloud and many do so by leveraging an SaaS model. Consequently, the number of applications that became network-centric has grown approximately exponentially with the raise of SaaS applications, such as Office 365, ServiceNow, SAP, voice, and video, to mention a few. All of these applications rely heavily on private networks and the Internet, bringing their own level of dynamicity with adaptive and fast changing workloads. On the network side, SD-WAN provides a high degree of flexibility allowing for efficient configuration management using SDN controllers with the ability to benefit from a plethora of transport access (e.g., MPLS. Internet with supporting multiple CoS, LTE, satellite links, etc.), multiple classes of service and policies to reach private and public networks via multi-cloud SaaS.

Furthermore, the level of dynamicity observed in today's network has never been so high. Millions of paths across thousands of Service Provides (SPs) and a number of SaaS applications have shown that the overall QoS(s) of the network in terms of delay, packet loss, jitter, etc. drastically vary with the region, SP, access type, as well as over time with high granularity. The immediate consequence is that the environment is highly dynamic due to:

New in-house applications being deployed;

New SaaS applications being deployed everywhere in the network, hosted by a number of different cloud providers;

Internet, MPLS, LTE transports providing highly varying performance characteristics, across time and regions;

SaaS applications themselves being highly dynamic: it is common to see new servers deployed in the network. DNS resolution allows the network for being informed of a new server deployed in the network leading to a new destination and a potentially shift of traffic towards a new destination without being even noticed.

According to various implementations, SDN controller 408 may employ application aware routing, which refers to the ability to route traffic so as to satisfy the requirements of the application, as opposed to exclusively relying on the (constrained) shortest path to reach a destination IP address. For instance, SDN controller 408 may make use of a high volume of network and application telemetry (e.g., from routers 110a-110b, SD-WAN fabric 404, etc.) so as to compute statistical and/or machine learning models to control the network with the objective of optimizing the application experience and reducing potential down times. To that end, SDN controller 408 may compute a variety of models to understand application requirements, and predictably route traffic over private networks and/or the Internet, thus optimizing the application experience while drastically reducing SLA failures and downtimes.

In other words, SDN controller 408 may first predict SLA violations in the network that could affect the QoE of an application (e.g., due to spikes of packet loss or delay, sudden decreases in bandwidth, etc.). In other words, SDN controller 408 may use SLA violations as a proxy for actual QoE information (e.g., ratings by users of an online application regarding their perception of the application), unless such QoE information is available from the provider of the online application. In turn, SDN controller 408 may then implement a corrective measure, such as rerouting the traffic of the application, prior to the predicted SLA violation. For instance, in the case of video applications, it now becomes possible to maximize throughput at any given time, which is of utmost importance to maximize the QoE of the video application. Optimized throughput can then be used as a service triggering the routing decision for specific application requiring highest throughput, in one implementation. In general, routing configuration changes are also referred to herein as routing "patches," which are typically temporary in nature (e.g., active for a specified period of time) and may also be application-specific (e.g., for traffic of one or more specified applications).

As noted above, the recent breakthroughs in large language models (LLMs), such as ChatGPT and GPT-4, represent new opportunities across a wide spectrum of industries. More specifically, the ability of these models to follow instructions now allow for interactions with tools (also called plugins) that are able to perform tasks such as searching the web, executing code, etc.

In the specific context of computer networks, though, network troubleshooting and monitoring are traditionally complex tasks that rely on engineers analyzing telemetry data, configurations, logs, and events across a diverse array of network devices encompassing access points, firewalls, routers, and switches managed by various types of network controllers (e.g., SD-WAN, DNAC, ACI, etc.). Moreover, network issues can manifest in various forms, stemming from a multitude of factors, each with its own level of complexity.

The introduction of plugins is a major development that enables LLM-based agents to interact with external systems and empower new domain-specific use cases. In the context of communication networks, the utilization of plugins allows LLMs to engage with documentation repositories, tap into knowledge bases, and interface with live network controllers and devices potentially opening the path to LLMs undertaking more complex tasks such as on-demand troubleshooting, device configuration, and performance monitoring.

Even in instances in which LLM agents have been devised to perform networking-related tasks such as those above, though, accurately and reliably evaluating their performance also remains challenging due to the complexities of deployed networks. Indeed, evaluating the performance of such an agent requires it to be used in a realistic representation of a network deployment (e.g., with multiple domains and controllers) against a large and diverse set of network states, impairments, and faults.

Testing Framework for Language Model-Based Computer Network Troubleshooting Agents The techniques introduced herein allow for the coordinated collection and instantiation of a large body of realistic network states, impairments, and faults against a representative target network environment. In further aspects, a domain-specific evaluation framework is introduced that is tailored to pose network-specific questions, allowing for robust performance evaluations of language model-based agents for complex, network-specific tasks like troubleshooting and monitoring. Such powerful combinations lay the foundations of a setup to create network states that can be used to train models capable of various tasks such as troubleshooting.

Illustratively, the techniques described herein may be performed by hardware, software, and/or firmware, such as in accordance with language model process 249, which may include computer executable instructions executed by the processor 220 (or independent processor of interfaces 210) to perform functions relating to the techniques described herein, such as in conjunction with network control process 248.

Specifically, according to various implementations, a device configures an impairment scenario in a computer network. The device performs an evaluation of the impairment scenario by a language model-based troubleshooting agent. The device makes a comparison between a root cause associated with the impairment scenario and the evaluation of the impairment scenario by the language model-based troubleshooting agent. The device provides an indication of the comparison.

Figure 5:
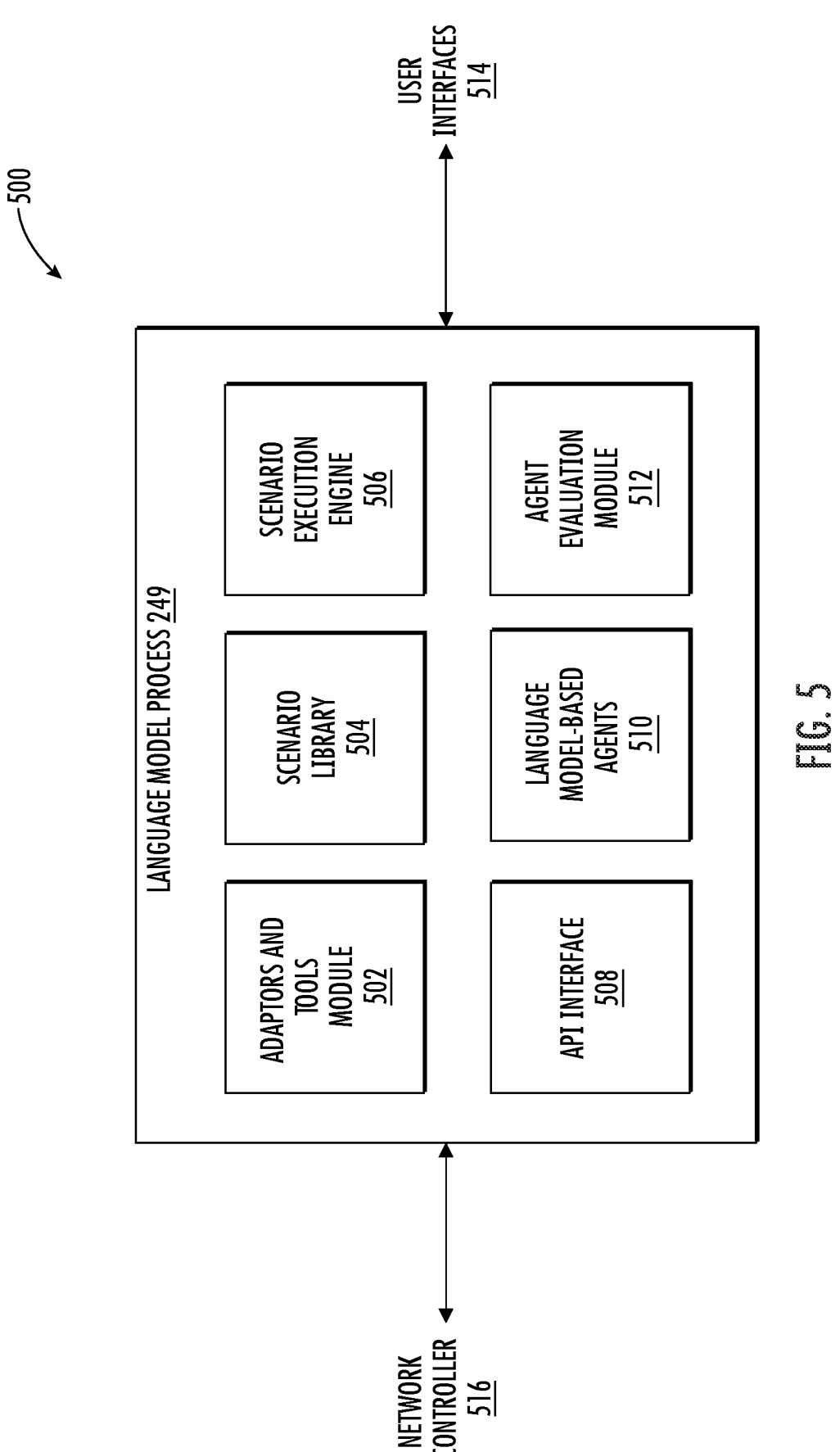
FIG. 5 illustrates an example architecture for a testing framework for language model-based computer network troubleshooting agents.

Operationally, FIG. 5 illustrates an example architecture 500 for a testing framework for language model-based computer network troubleshooting agents, according to various implementations. At the core of architecture 500 is language model process 249, which may be executed by a controller for a network or another device in communication therewith. For instance, language model process 249 may be executed by a controller for a network (e.g., SDN controller 408 in FIG. 4, a network controller in a different type of network, etc.), a particular networking device in the network (e.g., a router, a firewall, etc.), another device or service in communication therewith, or the like. For instance, as shown, language model process 249 may interface with a network controller 516, either locally or via a network, such as via one or more application programming interfaces (APIs), etc.

As shown, language model process 249 may include any or all of the following components: an adaptors and tools module 502, a scenario library 504, a scenario execution engine 506, an API interface 508, any number of language model-based agents 510, and/or an agent evaluation module 512. As would be appreciated, the functionalities of these components may be combined or omitted, as desired. In addition, these components may be implemented on a singular device or in a distributed manner, in which case the combination of executing devices can be viewed as their own singular device for purposes of executing language model process 249.

In various implementations, adaptors and tools module 502 may take the form of a collection of network adaptors and tools (automations) that can be instantiated against a network environment (e.g., a test/sandbox network) to modify its state as to introduce or remove impairments. For instance, adaptors and tools module 502 may include adaptors and tools to interface with network controller 516 and/or individual devices in the network, such as switches, access points (APs), wireless LAN controllers (WLCs), routers, firewalls, or the like.

More specifically, adaptors and tools module 502 may take a modular approach, where it leverages a variety of network adaptors to interact with systems or SDN controllers in the target networks. A few examples of such adaptors are listed below:

dnac-adaptor: interacts with DNAC controller over Representational state transfer (REST) API sdwan-adaptor: interacts with vManage controller over REST API netem-adaptor: interacts with Network Emulation devices over SSH protocol iperf-adaptor: controls iperf (unix) hosts over SSH protocol iosxe-adaptor: interacts with stand-alone IOS-XE devices over Netconf protocol As would be appreciated, the specific adaptors that adaptors and tools module 502 includes may vary, depending on the configuration and devices in the target network.

In addition, tools of adaptors and tools module 502 may take the form of automation abstractions consisting of a sequence of commands or API calls executed by the network adaptors. Typically, each tool will correspond to a particular type of network state change. A non-exhaustive example of such tools is found below:

sdwan-activate-central-policy: Activate a new SD-WAN central policy sdwan-attach-zbfw-firewall: Attach a local Zone Based firewall to a device sdwan-attach-circuit-policer: Attach a policer to a WAN circuit port sdwan-configure-static-route: Configure a new static route iperf-start: start traffic (create congestion)

iperf-stop: stop traffic netem-impairment: add loss, latency and jitter degradations on network links dnac-flap-interface: flap a network port on a device managed by DNAC dnac-device-reboot: reboot a device managed by DNAC iosxe-crash-iosd: crash the routing processor on a IOS-XE device iosxe-crash-pfe: crash the packet forwarding engine on a IOS-XE device rpi-change-wifi-credentials: change wifi credentials on unix host Similar to the adaptors, the tools of adaptors and tools module 502 may vary, depending on the target network.

Using the adaptors, many tools can also be created and made available for use by downstream components. Each tool exposes several configuration parameters that can be used to adjust its behavior, for example in the case of the "netem-impairment" the values of loss, latency, and jitter introduced can be dynamically controlled to increase or decrease the severity of the impact while in the case of "iperf-start," the amount of bandwidth and the duration of the data transfer can also be controlled.

Scenario library 504 of language model process 249 may take the form of a set of impairment scenario definitions, each corresponding to a particular network state or desired network outcome. In some instances, such scenarios may be defined by human subject matter experts (SMEs) via one or more user interfaces 514. Generally, the scenarios may be constructed to replicate failures or other issues that are commonly seen in real network environments, and which can then be used as a basis to help train and evaluate the performance of language model-based agents 510.

The scenarios in scenario library 504 may use the capabilities of adaptors and tools module 502 (e.g., a specific tool instantiated with specific input parameters), to manipulate the target network environment and introduce issues. For example, the tool "sdwan-activate-central-policy" could be used to activate an SD-WAN policy that drops all traffic destined to the identity services engine (ISE) server in the network from a particular site, leading to no new users being allowed to connect to the Wi-Fi network (e.g., managed by a DNAC controller). The same tool can also be instantiated with a different input parameter (e.g., a different policy name) to create a different type of issues, such as dropping traffic for an entire application or a specific user. Additionally, several tools can be combined to create more complex scenarios.

Using this approach, a large and diverse set of scenarios can be created using a relatively small number of tools in adaptors and tools module 502. By way of example, the non-exhaustive list below shows a series of impairment scenarios that may be defined, grouped by impact (e.g., no connectivity, intermittent connectivity, or poor performance) as perceived by an end user/host/client connected to the network, as well as the other parts of the network (e.g., WAN, Wireless LAN, Wired LAN) affected by the scenario/impairment:

No connectivity:
  Wired Access:
    LAN port down
    Access switch down
    DHCP issues
      No DHCP server connectivity (firewall filter issue or routing issue)
  Wi-Fi Access:
    Authentication, authorization, and accounting (AAA) issues:

Drop AAA traffic (firewall filter or routing issue)
 Wrong user password
 AP switched off
WAN:
 WAN circuits down/site down
 SD-WAN router crash
 Routing issue:
  user prefix not advertised/received (policy issue)
  default route not advertised/received (policy issue)
 Firewall issues:
  User traffic dropped by firewall
  Specific application dropped/not allowed
Intermittent Connectivity:
 Wired LAN:
  LAN port flapping
  Access switch reboot
 Wi-Fi LAN:
  Wireless AP flapping (stop PoE to APs)
  Wireless LAN controller (WLC) instability (reboot WLC services)
 WAN:
  WAN circuit(s) flapping
  Router crashes
Poor Performance:
 LAN:
  Wrong maximum transmission unit (MTU)
  Speed issues (10 Mb, half duplex, etc.)
 Wi-Fi:
  High channel utilization
 WAN
  WAN circuit quality degradation
  WAN circuit congestion
  Specific application rate-limited In various implementations, each scenario definition in scenario library 504 may include any or all of the following sections:

1. Metadata: This section may include general identification information such as the name of the scenario, a summary description, category, initialization time, etc., as well as the details of the impacted users and the exact root cause of the issue introduced. As described below, the metadata root cause details for the scenario can be used as an input during a performance evaluation of any of the language model-based agents 510 by comparing the root cause of the scenario with a root cause answer provided by a given agent.

2. Setup: This section may specify one or more steps required to execute the impairment scenario in the target network. Each step definition may include details about the impairment tool used in the step (e.g., 'tool: iperf-start', the device or system (e.g., 'executor: ibn-br-ams-nuc3') that will execute the step along with a set of default configuration parameters. The step configuration parameters can also be exposed to downstream components to be adjusted, dynamically.

3. Teardown: This section may also specify any steps required to restore the network environment to the initial default state.

For instance, FIG. 6 illustrates an example definition 600 of an impairment scenario following the above format. As shown, the impairment scenario relates to WAN circuit congestion that leads to poor connectivity. The root cause of this poor connectivity is packets being dropped due to WAN circuit congestion. In addition, definition 600 also defines how to setup the impairment scenario and to remove it, once testing of the scenario has completed.

Referring again to FIG. 5, scenario execution engine 506 is responsible for managing the execution of scenarios against the target network environment. During execution, scenario execution engine 506 performs several key functions. First, it is responsible for instantiating a given scenario by executing the steps defined in the setup section of its scenario definition in scenario library 504, when the scenario is first started. When required, scenario execution engine 506 may also repeat one or more of the steps at periodic intervals for as long as the scenario is active. Once the scenario is no longer required, scenario execution engine 506 may then run the teardown steps to clean up network environment.

Another potential function of scenario execution engine 506 is to keep track and report on the progress and status (e.g., failed, successful) of each step of the executing scenario. If one or more steps fail to execute, scenario execution engine 506 may abort the current scenario execution and notify upstream components and systems of the failure. This is particularly important as upstream systems may need to discard any results and/or data collected during a failed scenario.

Finally, in the case that any of the teardown steps fail to execute successfully, indicating that the target environment could not be restored to its default (unimpaired) state, scenario execution engine 506 may notify the system administrator via the one or more user interfaces 514 and stop accepting new scenarios for execution until the fault is manually cleared, since further testing could be influenced.

In large enough network environments, it may also be beneficial for scenario execution engine 506 to execute multiple scenarios in parallel. However, in this case it is important that special care is taken by scenario execution engine 506 to make sure that the scenarios do not interfere with each other. One way to make this assessment is by analyzing the scenario metadata field and reviewing the list of impacted users, with scenarios containing non-overlapping impacted user lists allowed to be run in parallel.

Other approaches may be implemented, too, where scenario execution engine 506 uses tags included in the scenario definition file in scenario library 504 that signal the potential for interfering scenarios. In yet another embodiment, scenario execution engine 506 could leverage an LLM or other tool to determine which scenarios may not overlap and can be executed in parallel (e.g., using a model trained to determine that impacted areas in the network are indeed disjointed and thus have no overlaps).

API interface 508 may expose different endpoints that allow an external system (e.g., game master, etc.) to launch scenarios and check on their execution statuses. As such, several API endpoints can be made available to control and monitor the overall system behavior, such as the following examples:

/getScenarios:
 returns a list of scenarios available in the scenario library and their associated metadata information.
 /startScenario:
 starts a specific scenario and returns the uuid of the execution task.
 Different scenarios can run at the same time, however, a single scenario cannot be instantiated multiple times in parallel.
 /stopScenario/<execution_id>:
 stop the scenario and restore the network environment to the default state
 /getScenarioStatus/<execution_id>:

Returns the current execution status of the scenario, including the status of each step.

/getScenarioExecutions?status=<status>:

Returns a list of scenarios based on their execution state (running, completed, failed)

/getScenarioLog/<execution_id>: Returns the detailed execution logs for each scenario, including the logs generated by the individual tools, network adaptors or end systems.

In one implementation, external systems may also poll API interface 508 periodically to get the latest status of various scenarios and logs. In other cases, API interface 508 may publish (push) to external systems using a messaging bus or web socket connections.

In various implementations, language model process 249 may also include agent evaluation module 512 that is configured to make a comparison between the root cause of a particular impairment scenario executed by scenario execution engine 506 in the target network and an assessment of the effects of that scenario by one of language model-based agents 510. For instance, agent evaluation module 512 may issue one or more queries to an agent in language model-based agents 510 regarding the test network, such as "why is my application running slowly," "why can't I connect to the network," or the like. In turn, the agent may interface with the network and use its language model (e.g., an LLM) to produce answer text regarding its assessment.

In some instances, agent evaluation module 512 may make a binary comparison between the root cause indicated in scenario library 504 and the output of the agent. In other cases, agent evaluation module 512 may compute a degree of similarity between the two. In turn, agent evaluation module 512 may compare the degree of similarity to a threshold, which could be set via one or more user interfaces 514, to determine whether the assessment of the impairment scenario by the agent was "correct" or "incorrect." In cases in which the agent was wrong, agent evaluation module 512 may use this to initiate retraining of the model of that agent, either directly or by providing an indication of the performance of that agent to one or more user interfaces 514.

Figure 7:
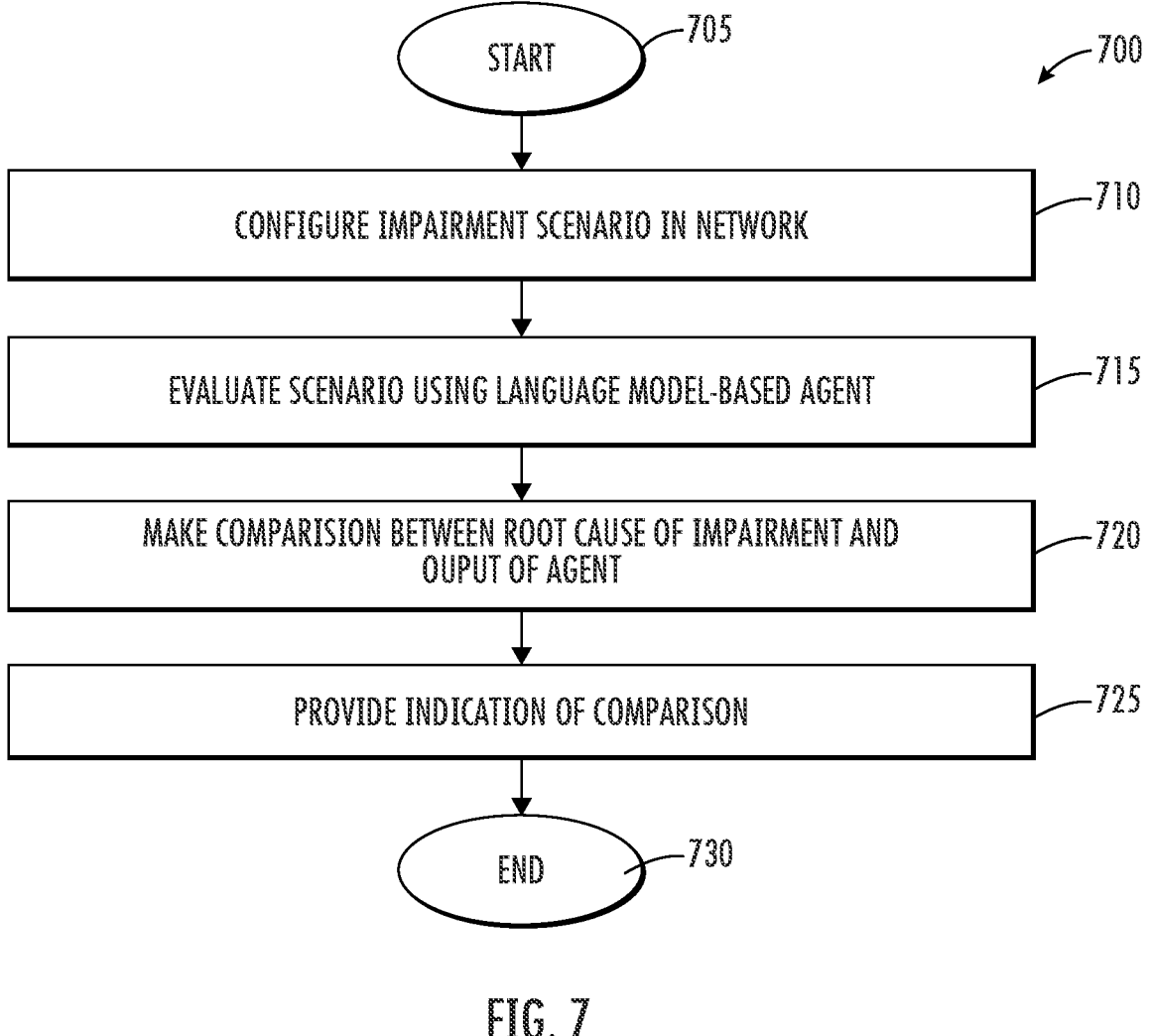
FIG. 7 illustrates an example simplified procedure for testing language model-based computer network troubleshooting agents.

FIG. 7 illustrates an example simplified procedure 700 (e.g., a method) for testing language model-based computer network troubleshooting agents, in accordance with one or more implementations described herein. For example, a non-generic, specifically configured device (e.g., device 200), such as a router, firewall, controller for a network (e.g., an SDN controller or other device in communication therewith), server, or the like, may perform procedure 700 by executing stored instructions (e.g., language model process 249 and/or network control process 248). The procedure 700 may start at step 705, and continues to step 710, where, as described in greater detail above, the device may configure an impairment scenario in a computer network. In various implementations, the device may maintain a library of impairment scenarios, configurations to implement the impairment scenarios in the computer network, and root causes for the impairment scenarios, wherein the device configures the impairment scenario in the computer network using the library. In some instances, the device may populate the library of impairment scenarios based on input from a user interface. In some cases, the device may configure the impairment scenario by determining whether the impairment scenario would conflict with another impairment scenario being executed in the computer network. In various implementations, the device may receive a request to test the language model-based troubleshooting agent using the impairment scenario. For instance, the device may receive the request from via an application programming interface (API). In some cases, the device configures the impairment scenario via an adapter for a controller of the computer network.

At step 715, as detailed above, the device may perform an evaluation of the impairment scenario by a language model-based troubleshooting agent. In some instances, the language model-based troubleshooting agent is based on a large language model (LLM). In some implementations, the device may issue one or more textual questions to the language model-based troubleshooting agent regarding the impairment scenario.

At step 720, the device may make a comparison between a root cause associated with the impairment scenario and the evaluation of the impairment scenario by the language model-based troubleshooting agent. For instance, the device may make a binary determination as to whether the root cause matches that indicated by the agent. In other cases, the device may determine a measure of similarity between the root cause and that indicated by the agent, using a threshold on the measure to determine whether the response by the agent was correct.

At step 725, as detailed above, the device may provide an indication of the comparison. In various embodiments, the indication of the comparison is used to initiate retraining of the language model-based troubleshooting agent. In some instances, the device may provide the indication to another system (e.g., one responsible for overseeing the testing, one responsible for retraining the agent, etc.). In further cases, the device may provide the indication to a user interface for presentation to an administrator or other interested party.

Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the implementations herein.

While there have been shown and described illustrative implementations that provide for testing language model-based computer network troubleshooting agents, it is to be understood that various other adaptations and modifications may be made within the spirit and scope of the implementations herein. For example, while certain implementations are described herein with respect to using certain models for purposes of generating CLI commands, making API calls, charting a network, and the like, the models are not limited as such and may be used for other types of predictions, in other implementations. In addition, while certain protocols are shown, other suitable protocols may be used, accordingly.

The foregoing description has been directed to specific implementations. It will be apparent, however, that other variations and modifications may be made to the described implementations, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the implementations herein. Therefore, it is the object of the appended claims to cover all such variations and modifications as come within the true spirit and scope of the implementations herein.

The invention claimed is:

1. A method comprising:

executing, by a device, a scenario execution engine that instantiates an impairment scenario from a scenario library by executing setup steps defined in a scenario definition, wherein the device configures the impairment scenario for a controller of the computer network and the setup steps utilize network adaptors and tools to modify a state of a computer network;

configuring, by the device, the impairment scenario in the computer network to produce an impaired computer network, wherein the impairment scenario corresponds to a particular state of connectivity of the computer network and has a root cause associated with it as specified in metadata of the scenario definition;

performing, by the device, an evaluation of the impairment scenario by a language model-based troubleshooting agent that interfaces with the impaired computer network using a language model to produce answer text regarding an assessment of the impairment scenario;

making, by the device, a comparison to determine a degree of similarity between the root cause associated with the impairment scenario as specified in the metadata and the evaluation of the impairment scenario by the language model-based troubleshooting agent by computing the degree of similarity between the root cause and the answer text produced by the language model-based troubleshooting agent; and providing, by the device, an indication of the comparison.

2. The method as in claim 1, further comprising:

maintaining, by the device, a library of impairment scenarios, configurations to implement the impairment scenarios in the computer network, and root causes for the impairment scenarios, wherein the device configures the impairment scenario in the computer network using the library.

3. The method as in claim 2, further comprising:

populating the library of impairment scenarios based on input from a user interface.

4. The method as in claim 1, wherein the language model-based troubleshooting agent is based on a large language model (LLM).

5. The method as in claim 1, wherein the indication of the comparison is used to initiate retraining of the language model-based troubleshooting agent.

6. The method as in claim 1, wherein configuring the impairment scenario in the computer network comprises:

determining, by the device, whether the impairment scenario would conflict with another impairment scenario being executed in the computer network.

7. The method as in claim 1, further comprising:

receiving, at the device, a request to test the language model-based troubleshooting agent using the impairment scenario.

8. The method as in claim 7, wherein the device receives the request from via an application programming interface (API).

9. The method as in claim 1, wherein performing the evaluation of the impairment scenario by the language model-based troubleshooting agent comprises:

issuing one or more textual questions to the language model-based troubleshooting agent regarding the impairment scenario.

10. The method as in claim 1, wherein the device configures the impairment scenario via an adapter.

11. An apparatus, comprising:

one or more network interfaces;

a processor coupled to the one or more network interfaces and configured to execute one or more processes; and a memory configured to store a process that is executable by the processor, the process when executed configured to:

executing a scenario execution engine that instantiates an impairment scenario from a scenario library by executing setup steps defined in a scenario definition, wherein the apparatus configures the impairment scenario via an adapter and the setup steps utilize network adaptors and tools to modify a state of a computer network;

configure the impairment scenario in the computer network to produce an impaired computer network, wherein the impairment scenario corresponds to a particular state of connectivity of the computer network and has a root cause associated with it as specified in metadata of the scenario definition;

perform an evaluation of the impairment scenario by a language model-based troubleshooting agent that interfaces with the impaired computer network using a language model to produce answer text regarding an assessment of the impairment scenario;

make a comparison to determine a degree of similarity between the root cause associated with the impairment scenario as specified in the metadata and the evaluation of the impairment scenario by the language model-based troubleshooting agent by computing the degree of similarity between the root cause and the answer text produced by the language model-based troubleshooting agent; and provide an indication of the comparison.

12. The apparatus as in claim 11, wherein the process when executed is further configured to:

maintain a library of impairment scenarios, configurations to implement the impairment scenarios in the computer network, and root causes for the impairment scenarios, wherein the apparatus configures the impairment scenario in the computer network using the library.

13. The apparatus as in claim 12, wherein the process when executed is further configured to:

populate the library of impairment scenarios based on input from a user interface.

14. The apparatus as in claim 11, wherein the language model-based troubleshooting agent is based on a large language model (LLM).

15. The apparatus as in claim 11, wherein the indication of the comparison is used to initiate retraining of the language model-based troubleshooting agent.

16. The apparatus as in claim 11, wherein the apparatus configures the impairment scenario in the computer network by:

determining whether the impairment scenario would conflict with another impairment scenario being executed in the computer network.

17. The apparatus as in claim 11, wherein the process when executed is further configured to:

receive a request to test the language model-based troubleshooting agent using the impairment scenario.

18. The apparatus as in claim 17, wherein the apparatus receives the request from via an application programming interface (API).

19. The apparatus as in claim 11, wherein the apparatus performs the evaluation of the impairment scenario by the language model-based troubleshooting agent by:

issuing one or more textual questions to the language model-based troubleshooting agent regarding the impairment scenario.

20. A tangible, non-transitory, computer-readable medium storing program instructions that cause a device to execute a process comprising:

executing, by a device, a scenario execution engine that instantiates an impairment scenario from a scenario library by executing setup steps defined in a scenario definition, wherein the device configures the impairment scenario for a controller of the computer network and the setup steps utilize network adaptors and tools to modify a state of a computer network;

configuring, by the device, the impairment scenario in the computer network to produce an impaired computer network, wherein the impairment scenario corresponds to a particular state of connectivity of the computer network and has a root cause associated with it as specified in metadata of the scenario definition;

performing, by the device, an evaluation of the impairment scenario by a language model-based troubleshooting agent that interfaces with the impaired computer network using a language model to produce answer text regarding an assessment of the impairment scenario;

making, by the device, a comparison to determine a degree of similarity between the root cause associated with the impairment scenario as specified in the metadata and the evaluation of the impairment scenario by the language model-based troubleshooting agent by computing the degree of similarity between the root cause and the answer text produced by the language model-based troubleshooting agent; and providing, by the device, an indication of the comparison.

* * * * *